US010626960B2

United States Patent
Kwon et al.

(10) Patent No.: US 10,626,960 B2
(45) Date of Patent: Apr. 21, 2020

(54) BELT CONNECTING STRUCTURE FOR VEHICLE

(71) Applicants: Hyundai Motor Company, Seoul (KR); Kia Motors Corporation, Seoul (KR)

(72) Inventors: Heedo Kwon, Gyeonggi-Do (KR); Kye Oong Song, Gyeonggi-Do (KR); Tae Hoon Roh, Seoul (KR); Jong Won Lee, Gyeonggi-Do (KR); Jaekyun Lee, Gyeonggi-Do (KR); In Jae Seo, Seoul (KR); Hyun Jeong Baek, Busan (KR); Jae Kyu Lee, Gyeonggi-Do (KR); Woong Na, Gyeonggi-Do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 256 days.

(21) Appl. No.: 15/822,270

(22) Filed: Nov. 27, 2017

(65) Prior Publication Data

US 2019/0085953 A1    Mar. 21, 2019

(30) Foreign Application Priority Data

Sep. 21, 2017  (KR) .......................... 10-2017-0121897

(51) Int. Cl.
 *F16H 7/12*  (2006.01)
 *F02B 67/06* (2006.01)
 (Continued)

(52) U.S. Cl.
 CPC .......... *F16H 7/1281* (2013.01); *F02B 67/06* (2013.01); *F16H 7/02* (2013.01); *F16H 55/36* (2013.01);
 (Continued)

(58) Field of Classification Search
 CPC .......... F16H 7/1281; F16H 2007/0806; F16H 2007/0874; F16H 2007/081; F02B 67/06
 (Continued)

(56) References Cited

U.S. PATENT DOCUMENTS 4,661,087 A * 4/1987 Henderson ............ F16H 7/1218
                                                   474/117
4,758,208 A * 7/1988 Bartos ................... F16H 7/1281
                                                   474/135
(Continued)

FOREIGN PATENT DOCUMENTS

JP   2015117611 A   6/2015
KR   2014-0066058 A   5/2014

*Primary Examiner* — Henry Y Liu
(74) *Attorney, Agent, or Firm* — Mintz Levin Cohn Ferris Glovsky and Popeo, P.C.; Peter F. Corless

(57) ABSTRACT

A belt connection structure for a vehicle is provided. The belt connection structure includes a damper pulley mounted on a crankshaft of an engine, a water pump mounted on the engine separated in an upward direction from the damper pulley, a mild hybrid starter and generator on an upper part of the engine separated from the water pump, and an air conditioner mounted on the engine separated from the compressor damper pulley. A first belt connects the damper pulley, water pump, and mild hybrid starter and generator and a second belt connects the damper pulley and the air conditioner compressor. A first tensioner is mounted on the mild hybrid starter and generator and selectively in contact on the first belt to adjust a tension and a second tensioner is mounted on a chain cover and selectively in contact under the first belt to adjust the tension of the first belt.

5 Claims, 3 Drawing Sheets

(51) Int. Cl.
*F16H 7/02* (2006.01)
*F16H 55/36* (2006.01)
*F16H 7/08* (2006.01)

(52) U.S. Cl.
CPC ............... *F16H 2007/0812* (2013.01); *F16H 2007/0865* (2013.01); *F16H 2007/0874* (2013.01); *F16H 2007/0893* (2013.01); *F16H 2007/0897* (2013.01); *F16H 2055/366* (2013.01)

(58) Field of Classification Search
USPC ........................................................ 474/134
See application file for complete search history.

(56) References Cited

U.S. PATENT DOCUMENTS

| | | | | |
|---|---|---|---|---|
| 4,959,042 A * | 9/1990 | Tanaka | ................. | F02B 67/06 474/134 |
| 4,997,409 A * | 3/1991 | Sonoda | ................. | F02B 37/02 474/101 |
| 5,131,889 A * | 7/1992 | Meckstroth | ............. | F02B 67/06 474/117 |
| 5,722,909 A * | 3/1998 | Thomey | ................. | F02B 67/06 474/87 |
| 6,648,783 B1 * | 11/2003 | Bogner | ................. | F16H 7/1281 474/134 |
| 7,494,434 B2 * | 2/2009 | McVicar | ................. | F16H 7/1281 474/101 |
| 8,057,334 B2 * | 11/2011 | Kotzur | .................. | F16H 7/1281 474/133 |
| 8,439,780 B2 * | 5/2013 | Ruffini | .................. | F16H 7/1281 474/112 |
| 8,568,259 B2 * | 10/2013 | Robbins | ................ | F16H 7/1281 474/135 |
| 8,602,930 B2 * | 12/2013 | Deneszczuk | .......... | F16H 7/1281 474/112 |
| 10,018,254 B2 * | 7/2018 | Wright | .................... | F02B 63/04 |
| 2002/0012593 A1 * | 1/2002 | Okuda | ....................... | F01P 5/12 417/362 |
| 2006/0287146 A1 * | 12/2006 | McVicar | ............... | F16H 7/1281 474/109 |
| 2007/0037648 A1 * | 2/2007 | Di Giacomo | ......... | F16H 7/1281 474/134 |
| 2010/0331127 A1 * | 12/2010 | Dec | ....................... | F16H 7/1218 474/135 |
| 2011/0065539 A1 * | 3/2011 | Robbins | ................ | F16H 7/1281 474/135 |
| 2011/0070985 A1 * | 3/2011 | Deneszczuk | .......... | F16H 7/1281 474/135 |
| 2012/0178563 A1 * | 7/2012 | Lee | ....................... | F16H 7/1281 474/110 |
| 2012/0318589 A1 * | 12/2012 | Staley | ................... | F16H 7/1281 180/65.21 |
| 2015/0167797 A1 * | 6/2015 | Noguchi | ............... | F16H 7/1281 477/3 |
| 2016/0273624 A1 * | 9/2016 | Suzuki | .................. | F16H 7/1281 |

* cited by examiner

BELT CONNECTING STRUCTURE FOR VEHICLE

CROSS-REFERENCE TO RELATED APPLICATION

This application claims priority to and the benefit of Korean Patent Application No. 10-2017-0121897 filed on Sep. 21, 2017, the entire contents of which are incorporated herein by reference.

BACKGROUND

(a) Field of the Invention

The present disclosure relates to a belt connection structure for a vehicle, and more particularly, to a belt connection structure for a vehicle that connects a belt by optimizing an arrangement of each of accessory elements and a tensioner mounted on an engine in a hybrid vehicle that includes a mild hybrid starter and generator.

(b) Description of the Related Art

Generally, accessory elements including a camshaft, an alternator, a power steering pump, an air conditioner compressor, etc. are mounted on an engine and are connected to a crankshaft of the engine by a belt. Accordingly, power of the crankshaft is transmitted to the accessory elements by a frictional force of the belt. Recently, in a hybrid vehicle, a mild hybrid starter and generator is applied for operation of a vehicle (e.g., during starting, or a low engine speed, or an operation stopping section of the engine). Accordingly, the mild hybrid starter and generator is mounted on the engine of the hybrid vehicle along with the accessory elements and is connected to the crankshaft and the accessory elements via the belt.

Since the mild hybrid starter and generator is heavily loaded, there is an increased possibility that a slip of the belt occurs, and adjustment of a tension of the belt according to an operation condition is necessary. When the tension of the belt is overloaded, the frictional force of the belt increases and the friction loss increases. When the tension of the belt is reduced, the slip of the belt occurs and a power delivery efficiency is insufficient. Accordingly, a tensioner for a tension adjustment of the belt is mounted on the engine to be in contact with the belt.

However, in the above-mentioned conventional tensioner mounting structure, when the tensioner is mounted on the engine while avoiding an interference with each of the constituent elements in an operation range of the tensioner, an arrangement layout of each of the accessory elements is constrained. Accordingly, the size of the engine increases thus decreasing the compact configuration and a belt connection structure connecting each of the accessory elements becomes more complex. Additionally, in the conventional belt connection structure sufficiently obtaining a length of a tensioner arm to operate the tensioner installed in a limited installing space while avoiding the interference with each accessory element is difficult. In other words, a durability of the tensioner and a belt conformability deteriorate.

The above information disclosed in this section is merely for enhancement of understanding of the background of the disclosure and therefore it may contain information that does not form the prior art that is already known in this country to a person of ordinary skill in the art.

SUMMARY

The present disclosure provides a belt connection structure for a vehicle for more effectively connecting a belt by optimizing an arrangement layout of each of accessory elements and a tensioner mounted on an engine in a hybrid vehicle to which a mild hybrid starter and generator is applied.

In an aspect of an exemplary embodiment of the present disclosure, a belt connection structure for a vehicle may include a damper pulley mounted on a crankshaft of an engine, a water pump mounted on the engine at a position separated in an upward direction from the damper pulley, and a mild hybrid starter and generator mounted on an upper portion of the engine at a position separated from the water pump based on a width direction of the engine, an air conditioner mounted on the engine at a position separated from the compressor damper pulley. Additionally, the belt connection structure may include a first belt connecting the damper pulley, the water pump, and the mild hybrid starter and generator, a second belt connecting the damper pulley and the air conditioner compressor, a first tensioner mounted on the mild hybrid starter and generator and selectively in contact on the first belt disposed between the water pump and the mild hybrid starter and generator configured to adjust a tension of the first belt and a second tensioner mounted on a chain cover mounted on the engine between the damper pulley and the mild hybrid starter and generator and selectively in contact under the first belt disposed between the damper pulley and the mild hybrid starter and generator configured to adjust the tension of the first belt.

In some exemplary embodiments, the air conditioner compressor may be disposed under the engine at a position separated in a diagonal direction of the mild hybrid starter and generator based on a width direction of the engine. The mild hybrid starter and generator may be mounted through the chain cover mounted at a first side of the engine in an opposite direction of the air conditioner compressor.

The first tensioner may include a first tensioner arm having a first end hinge-connected to the mild hybrid starter and generator, and a first pulley mounted on a second end of the first tensioner arm to be rotatable and selectively in contact with the first belt in an upward direction based on a height direction of the engine. In the first tensioner arm, a length D from a rotation center C mounted on the mild hybrid starter and generator to a mounting point P of the first pulley may be about 80 mm.

Additionally, the second tensioner may include a second tensioner arm having a first end mounted on the chain cover corresponding to the damper pulley to be rotatable under the engine, a second pulley mounted on a second end of the second tensioner arm to be rotatable and selectively in contact with the first belt in a downward direction based on a height direction of the engine and a hydraulic system having a first end hinge-connected to a first side of a lower portion of the second tensioner arm and a second end hinge-connected to the chain cover between the water pump and the mild hybrid starter and generator and configured to selectively operate the second tensioner arm. The second tensioner arm and the hydraulic system are disposed in parallel with each other.

According to the belt connection structure for the vehicle according to an exemplary embodiment of the present disclosure, when the arrangement layout of each accessory elements mounted on the engine and the first and second tensioners is optimized and the first and second belts are efficiently connected in the hybrid vehicle to which the mild hybrid starter and generator is applied, the size of the engine having the accessory elements mounted therein may be reduced and the compact configuration of the accessory elements may be planned.

Additionally, when the length D of the first tensioner arm is sufficiently secured, the durability of the first tensioner and the belt conformability may be improved. When the second tensioner arm and the hydraulic system are disposed in parallel in the second tensioner the mounting space and the operation space of the second tensioner may be improved and the interference with other parts (e.g., the drive shaft) may be avoided. When the length of the first belt and the second belt mutually connecting the damper pulley and each of the accessory elements is optimized, a cost reduction may be planned.

BRIEF DESCRIPTION OF THE DRAWINGS

The above and other objects, features and advantages of the present disclosure will be more apparent from the following detailed description taken in conjunction with the accompanying drawings.

DESCRIPTION OF SYMBOLS

Figure 1:
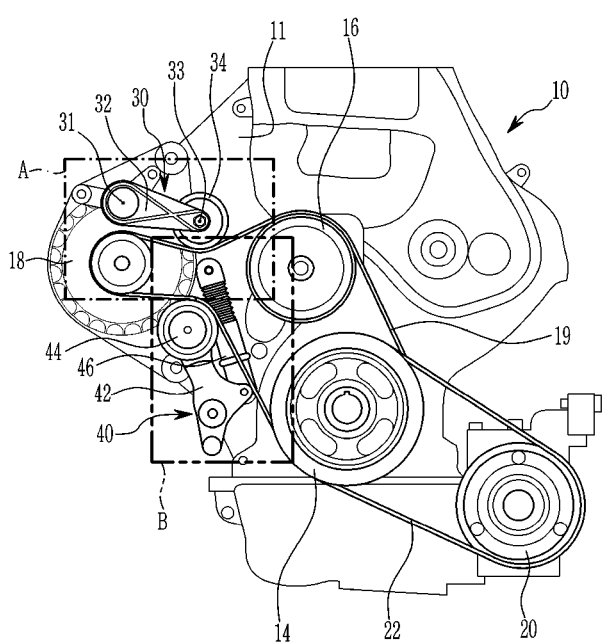
FIG. 1 is an exemplary schematic diagram of a belt connection structure for a vehicle according to an exemplary embodiment of the present disclosure.

10: engine
11: chain cover
12: crankshaft
14: damper pulley
16: water pump
18: mild hybrid starter and generator
19: first belt
20: air conditioner compressor
22: second belt
30: first tensioner
32: first tensioner arm
34: first pulley
40: second tensioner
42: second tensioner arm
44: second pulley
46: hydraulic system

DETAILED DESCRIPTION

An exemplary embodiment of the present disclosure will hereinafter be described in detail with reference to the accompanying drawings. While the disclosure will be described in conjunction with exemplary embodiments, it will be understood that present description is not intended to limit the invention to those exemplary embodiments. On the contrary, the disclosure is intended to cover not only the exemplary embodiments, but also various alternatives, modifications, equivalents and other exemplary embodiments, which may be included within the spirit and scope of the disclosure as defined by the appended claims.

Components unrelated to the description will be omitted in order to obviously describe the present disclosure, and like reference numerals will be used to describe like components throughout the present specification. Further, in the drawings, the sizes and the thicknesses of the components are exemplarily provided for the convenience of description, the present disclosure is not limited those shown in the drawings, and the thicknesses are exaggerated to clearly show several parts and regions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, in order to make the description of the present invention clear, unrelated parts are not shown and, the thicknesses of layers and regions are exaggerated for clarity. Further, when it is stated that a layer is "on" another layer or substrate, the layer may be directly on another layer or substrate or a third layer may be disposed there between.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Although an exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

It is understood that the term "vehicle" or "vehicular" or other similar term as used herein is inclusive of motor vehicle in general such as passenger automobiles including sports utility vehicles (SUV), buses, trucks, various commercial vehicles, watercraft including a variety of boats, ships, aircraft, and the like and includes hybrid vehicles, electric vehicles, combustion, plug-in hybrid electric vehicles, hydrogen-powered vehicles and other alternative fuel vehicles (e.g. fuels derived from resources other than petroleum).

Figure 2:
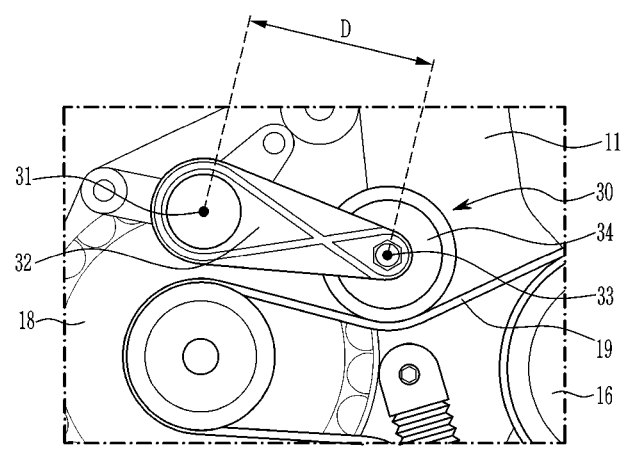
FIG. 2 is an exemplary enlarged view of a part A of FIG. 1 according to an exemplary embodiment of the present disclosure.
Figure 3:
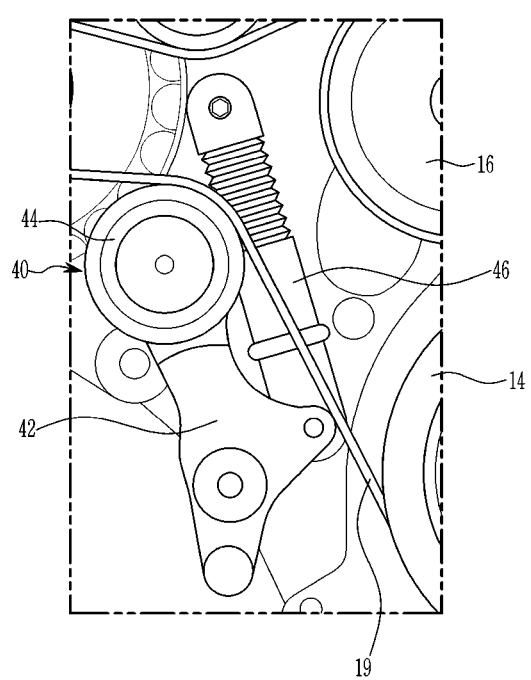
FIG. 3 is an exemplary enlarged view of a part B of FIG. 1 according to an exemplary embodiment of the present disclosure.

FIG. 1 is an exemplary schematic diagram of a belt connection structure for a vehicle according to an exemplary embodiment of the present disclosure. FIG. 2 is an exemplary enlarged view of a part A of FIG. 1. FIG. 3 is an exemplary enlarged view of a part B of FIG. 1. Referring to FIG. 1, a damper pulley 14 and accessory elements including a water pump 16, a mild hybrid starter and generator 18, and an air conditioner compressor 20 may be mounted on an engine 10 having a belt connection structure for a vehicle according to an exemplary embodiment of the present disclosure. The damper pulley 14 may be mounted on a crankshaft 12 provided on a cylinder block (not shown). The water pump 16 may be mounted on the engine 10 at a position separated in an upward direction from the damper pulley 14.

The mild hybrid starter and generator 18 may be mounted at an upper portion of the engine 10 at a position separated from the water pump 16 with respect to a width direction of the engine 10. For example, the mild hybrid starter and generator 18 may be mounted through a chain cover 11 mounted at a first side of the engine 10. Additionally, the mild hybrid starter and generator 18 may be mounted on the chain cover 11 at the position separated from the water pump 16 in a right width direction of the vehicle. The damper pulley 14, the water pump 16, and the mild hybrid starter and generator 18 may be connected through a first belt 19.

In other words, the first belt 19 may mutually connect the damper pulley 14, the mild hybrid starter and generator 18, and the water pump 16 to transmit a power of the crankshaft 12, or a power of the mild hybrid starter and generator 18 to the water pump 16. The air conditioner compressor 20 may be mounted on the engine 10 at a positon separated from the damper pulley 14. The air conditioner compressor 20 may be disposed at a lower portion of the engine 10 at a position separated in a diagonal direction of the mild hybrid starter and generator 18 with respect to the width direction of the engine 10. In particular, the mild hybrid starter and generator 18 may be mounted through the chain cover 11 mounted at one side of an upper portion of the engine 10 at the positon separated from the air conditioner compressor 20 in the diagonal direction. Additionally, the air conditioner compressor 20 may be mounted at one side of a lower portion of the engine 10 having an oil pan 23 positioned thereon.

In particular, the damper pulley 14 and the air conditioner compressor 20 may be connected through a second belt 22. The second belt 22 may connect the damper pulley 14 and the air conditioner compressor 20 separately from the first belt 19 and may be configured to transmit the power of the crankshaft 12, or the power of the mild hybrid starter and generator 18 to the air conditioner compressor 20. The above-configured engine 10 may respectively be configured to transmit the power of the crankshaft 12 or the power of the mild hybrid starter and generator 18 to the water pump 16 and the air conditioner compressor 18 through the first and second belts 19 and 22 based on a driving condition of the vehicle.

FIG. 1 is an exemplary front view showing the front of the engine 10, the damper pulley 14 may be disposed on the front of the engine 10, the mild hybrid starter and generator 18 may be positioned at the right of the engine 10 (e.g., a left side with respect to FIG. 1), and the air conditioner compressor 20 may be positioned at the left of the engine 10 (e.g., the right side with respect to FIG. 1). As above-described, first and second tensioners 30 and 40 for adjusting the tension of the first belt 19 according to the driving condition of the vehicle may be mounted on the engine 10 to which the accessory elements are mounted.

First, as shown in FIG. 2, the first tensioner 30 may be mounted on the mild hybrid starter and generator 18 between the water pump 16 and the mild hybrid starter and generator 18. The first tensioner 30 may include a first tensioner arm 32 and a first pulley 34. A first end of the first tensioner arm 32 may be hinge-connected to the mild hybrid starter and generator 18. Additionally, the first pulley 34 may be mounted on a second end of the first tensioner arm 32 to be rotatable and may be selectively in contact with the first belt 19 in an upward direction with respect to the height direction of the engine 10. The above-configured first tensioner 30 may be a mechanical tensioner. For example, in the first tensioner arm 32, a length D from a rotation center 31 mounted on the mild hybrid starter and generator 18 to a mounting point 33 of the first pulley 34 may be about 80 mm. Accordingly, when the first tensioner arm 32 secures the length D of the about 80 mm, the first tensioner 30 may improve the durability and belt conformability.

In particular, in the belt connection structure for the vehicle, when the first tensioner 30 is mounted on the mild hybrid starter and generator 18 to secure the length D of the first tensioner arm 32 the interference with other parts within an operation radius may be prevented. Accordingly, the durability and the performance dissatisfaction due to the lack of length of the tensioner arm compared with the conventional may be solved.

In the present exemplary embodiment, as shown in FIG. 3, the second tensioner 40 may be mounted on the chain cover 11 that is mounted on the engine 10 between the damper pulley 14 and the mild hybrid starter and generator 18. For example, the second tensioner 40 may include a second tensioner arm 42, a second pulley 44, and a hydraulic system 46. A first end of the second tensioner arm 42 may be mounted corresponding to the damper pulley 14 on the chain cover 11 to be rotatable under the engine 10. The second pulley 44 may be mounted on a second end of the second tensioner arm 42 to be rotatable. The second pulley 44 may be selectively in contact with the first belt 19 in a downward direction with respect to the height direction of the engine 10. Additionally, the hydraulic system 46 may include a first end that is hinge-connected at a first side of the lower portion of the second tensioner arm 44 and a second end that is hinge-connected to the chain cover 11 between the water pump 16 and the mild hybrid starter and generator 18. The hydraulic system 46 may be configured to selectively operate the second tensioner arm 44.

The above-configured second tensioner 40 may be a hydraulic tensioner. For example, the second tensioner arm 44 and the hydraulic system 46 may be disposed in parallel. In other words, the second tensioner 40 may be disposed in parallel and hinge-connected to a drive shaft (not shown) connected to a wheel under the engine 10 to secure the operation range while avoiding the interference. Accordingly, when the hydraulic system 44 is operated, the second tensioner 40 may be configured to move outside the engine 10 toward the mild hybrid starter and generator 18 with respect to a first end where the second tensioner arm 42 is mounted on the chain cover 11 or may be configured to move to the center of the engine 10 toward the damper pulley 14. Accordingly, as the second pulley 44 move more smoothly according to the driving condition of the engine 10 to be in contact with the first belt 19, the second pulley 44 may be configured to effectively adjust the tension of the first belt 19 along with the first tensioner 30.

Accordingly, when the belt connection structure for the vehicle is applied, the arrangement layout of each accessory elements mounted on the engine 10 and the first and second tensioners 30 and 40 may be optimized and the first and second belts 19 and 22 may be more efficiently connected in the hybrid vehicle having the mild hybrid starter and generator 18 applied thereto. Accordingly, the size of the engine 10 that has the accessory elements mounted thereon may be reduced and the compact configuration of the accessory elements may be realized.

Additionally, when the length D of the first tensioner arm 32 is sufficiently secured, the durability of the first tensioner 30 and the belt conformability may be improved. When the second tensioner arm 42 and the hydraulic system 46 are disposed in a parallel structure in the second tensioner 40, the mounting space and the operation space of the second tensioner 40 may be optimized and the interference with other components such as the drive shaft may be avoided. When the length of the first belt 19 and the second belt 22 that mutually connect the damper pulley 14 and each of the accessory elements is optimized, a cost reduction may be planned.

While this disclosure has been described in connection with what is presently considered to be exemplary embodiments, it is to be understood that the disclosure is not limited to the disclosed exemplary embodiments, but, on the contrary, is intended to cover various modifications and equivalent arrangements included within the spirit and scope of the appended claims.

What is claimed is:

1. A belt connection structure for a vehicle, comprising:
    a damper pulley mounted on a crankshaft of an engine;
    a water pump mounted on the engine at a position separated in an upward direction from the damper pulley;
    a mild hybrid starter and generator mounted on an upper portion of the engine at a position separated from the water pump based on a width direction of the engine;
    an air conditioner compressor mounted on the engine at a position separated from the damper pulley;
    a first belt connecting the damper pulley, the water pump, and the mild hybrid starter and generator;
    a second belt connecting the damper pulley and the air conditioner compressor;
    a first tensioner mounted on the mild hybrid starter and generator and selectively in contact on the first belt disposed between the water pump and the mild hybrid starter and generator to adjust a tension of the first belt; and
    a second tensioner mounted on a chain cover mounted on the engine between the damper pulley and the mild hybrid starter and generator and selectively in contact under the first belt disposed between the damper pulley and the mild hybrid starter and generator to adjust the tension of the first belt,
    wherein the second tensioner includes:
        a second tensioner arm having a first end mounted on the chain cover corresponding to the damper pulley to be rotatable under the engine;
        a second pulley mounted on a second end of the second tensioner arm to be rotatable and selectively in contact with the first belt in a downward direction based on a height direction of the engine; and
        a hydraulic system having a first end hinge-connected to one side of a lower portion of the second tensioner arm and a second end hinge-connected to the chain cover between the water pump and the mild hybrid starter and generator and configured to selectively operate the second tensioner arm,
        the second tensioner arm and the hydraulic system being disposed in parallel in the second tensioner so as to optimize a mounting space of the second tensioner and avoid interference with other components.

2. The belt connection structure for the vehicle of claim 1, wherein the air conditioner compressor is disposed under the engine at a position separated in a diagonal direction of the mild hybrid starter and generator based on a width direction of the engine.

3. The belt connection structure for the vehicle of claim 1, wherein the mild hybrid starter and generator is mounted through the chain cover disposed at one side of the engine in an opposite direction of the air conditioner compressor.

4. The belt connection structure for the vehicle of claim 1, wherein the first tensioner includes:
    a first tensioner arm having a first end hinge-connected to the mild hybrid starter and generator; and
    a first pulley mounted on a second end of the first tensioner arm to be rotatable and selectively in contact with the first belt in an upward direction based on a height direction of the engine.

5. The belt connection structure for the vehicle of claim 4, wherein in the first tensioner arm, a length from a rotation center mounted on the mild hybrid starter and generator to a mounting point of the first pulley is about 80 mm.

* * * * *